United States Patent [19]

Kunert et al.

[11] Patent Number: 5,057,354
[45] Date of Patent: Oct. 15, 1991

[54] MOTOR VEHICLE GLAZING WITH PREASSEMBLED TEAR-AWAY CORD AND METHOD FOR ITS PREPARATION

[75] Inventors: Heinz Kunert, Cologne; Hans Ohlenforst, Aachen; Gerd Cornils, Merzenich-Girbelsrath, all of Fed. Rep. of Germany

[73] Assignee: Saint-Gobain Vitrage International, Aubervilliers, France

[21] Appl. No.: 429,925

[22] Filed: Oct. 31, 1989

[30] Foreign Application Priority Data

Oct. 31, 1988 [DE] Fed. Rep. of Germany ....... 3837043

[51] Int. Cl.[5] .......................... B32B 23/02; B60J 1/00
[52] U.S. Cl. ...................................... 428/192; 428/38;
   428/43; 428/81; 428/105; 428/120; 428/167;
   428/172; 428/157; 428/200; 428/201; 428/292;
       428/353; 428/343; 296/84.1; 296/96.21;
              156/108; 156/293; 156/500; 52/171
[58] Field of Search ................... 428/34, 192, 38, 181,
       428/156, 167, 172, 43, 81, 105, 119, 120, 200,
           201, 292, 353, 343, 157; 296/84.1, 96.21, 200;
                   156/108, 500, 293, 310; 52/171, 788, 823

[56] References Cited

U.S. PATENT DOCUMENTS

| | | | |
|---|---|---|---|
| 3,707,521 | 12/1972 | De Santis | 260/37 N |
| 3,779,794 | 12/1973 | De Santis | 117/72 |
| 4,551,372 | 11/1985 | Kunert | 428/38 |
| 4,581,276 | 4/1986 | Kunert | 428/157 |
| 4,683,694 | 8/1987 | Ziegler | 52/208 |
| 4,704,175 | 11/1987 | Kunert | 428/192 |
| 4,876,132 | 10/1989 | Kunert | 428/43 |
| 4,910,071 | 3/1990 | Kunert | 428/192 |

Primary Examiner—Ellis P. Robinson
Assistant Examiner—Donald J. Loney
Attorney, Agent, or Firm—Pennie & Edmonds

[57] ABSTRACT

A motor vehicle glazing prepared for bonding with the window frame of a motor vehicle body is provided with a profile bead and a single tear-away cord. The profile bead serves as an intermediate body between the glazing surface and an assembly adhesive. In the area coming in contact with the assembly adhesive the width of the profile bead is selected to inhibit the lateral overflow of the assembly adhesive over the profile bead during installation. A tear-away cord is placed inside the profile bead or in its immediate vicinity to shear through the profile bead when removing glazing. The profile bead itself or the adhesive bonding of the profile bead to the glazing surface is shaped so that the width of the section of profile bead to be sheared through by the tear-away cord is substantially smaller than the width of the area coming in contact with the assembly adhesive.

10 Claims, 3 Drawing Sheets

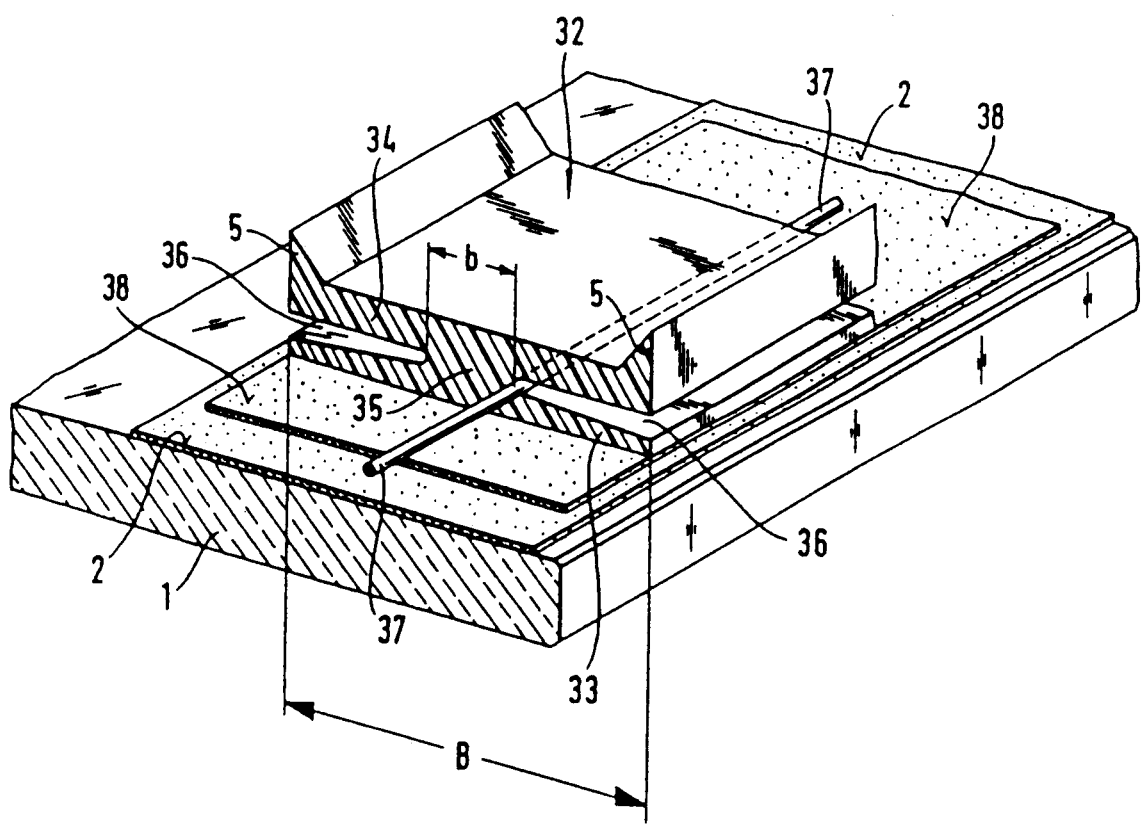

MOTOR VEHICLE GLAZING WITH PREASSEMBLED TEAR-AWAY CORD AND METHOD FOR ITS PREPARATION

CROSS REFERENCE TO RELATED PATENTS

Related patents are U.S. Pat. Nos. 3,707,521, 3,779,794, 4,581,276, and 4,876,132, which are incorporated herein by reference.

BACKGROUND OF THE INVENTION

This invention relates to a motor vehicle glazing provided for bonding with the window frame of a motor vehicle body. More particularly, it relates to a profile bead placed along the glazing edge that forms an intermediate body between the glazing and an assembly adhesive that secures the glazing in the window frame and to a wire or a flexible tear-away cord with high tensile strength placed inside or immediately next to the profile bead to shear the profile bead when removing the glazing.

In a known installation method (U.S. Pat. No. 4,876,132), a profile bead is deposited by extrusion of an adhesive on the edge of the glazing and a flexible tear-away cord is placed either in the core of the profile bead or in its immediate vicinity. After setting, the profile bead serves as an intermediate body or intermediate layer between the glazing and the assembly adhesive. In this known process, to remove the glazing from the vehicle, the flexible cord must shear the entire width of the profile bead to sever the bond between the glazing and the window frame. Since the adhesives used for the profile bead are materials that harden in the set condition and exhibit a comparatively high shear strength, comparatively high tensile stresses are required to shear the profile bead over the entire width of said bead. Therefore, there is a risk that in the process of shearing the profile bead the breaking load of the tear-away cord will be exceeded, and the cord will break, leaving the glazing secured in place in the window frame.

While the tensile stresses required to shear the profile bead decrease as the width of the profile bead decreases, a reduction in the width of the profile bead cannot be used to avoid the risk of a broken tear-away cord. For proper installation of the glazing a certain minimum cross section is required for the assembly adhesive that secures the profile bead and hence the glazing to the window frame. A profile bead that is too narrow would result in the assembly adhesive flowing out laterally over the profile bead when the glazing is inserted and result in the enlargement of the cross section to be sheared through.

To reduce the forces necessary to shear the profile bead, it has already been proposed (U.S. Pat. No. 4,876,132) to place multiple tear-away cords inside the profile bead or immediately next to the bead. To remove the glazing with such an arrangement, each of the cords cuts through only a part of the cross section of the profile bead thereby reducing the tensile stresses on the cords. However, embedding or placing multiple cords is an additional expense.

SUMMARY OF THE INVENTION

An object of the present invention is to configure a glazing with a profile bead and a single tear-away cord so that the tensile strength required for shearing the profile bead is reduced, thereby reducing or eliminating the risk of the cord being broken during shearing of the profile bead.

This object is achieved according to the invention by making the width of the section to be sheared by the tear-away cord substantially narrower than the width of the profile bead in the area coming in contact with the assembly adhesive. As a result, the width of the profile bead in the area in contact with the assembly adhesive can be whatever size is needed to prevent lateral overflow of the assembly adhesive over the profile bead. At the same time, the width of the profile bead to be sheared by the tear-away cord can be reduced to accommodate the tensile strength of the tear-away cord.

Advantageously, the width of the section to be sheared by the tear-away cord amounts to no more than half the width of the profile bead in the area coming in contact with the assembly adhesive. It has been shown that with the standard adhesives for production of the profile bead, the width of the section to be sheared by the cord is suitably 3 to 6 mm, while the width of the profile bead in the area coming in contact with the assembly adhesive is 10 to 25 mm.

According to a first embodiment of the invention, while the profile bead is extruded so as to have a lower surface adjacent to the glazing of approximately the same width as an upper surface coming in contact with the assembly adhesive, measures are taken so that only a portion of the lower surface of the profile bead is bonded to the glazing. Prevention of bonding of portions of the lower surface of the bead may be accomplished by the application of a suitable separating agent or anti-adhesion promoter to this area. Alternatively, where prior priming is necessary for the bonding, the required priming layer is applied only to the surface area where a bond is to be established between the bead and the glazing. In each of these embodiments, the tear-away cord is located on the glazing surface adjacent the bond.

In another embodiment of the invention, the profile bead has a basically T-shaped or mushroom-shaped cross section, and only the base of the T-shaped profile bead is brought in contact with the glazing surface. This results in two small air gaps above the glazing surface. After setting of the profile bead, the tear-away cord may be inserted in one of the air gaps thus formed.

In another embodiment, the cross-sectional shape of the profile bead is varied so as to provide at some point between the lower and upper surfaces of the bead a substantially narrower cross-section in which the tear-away cord is placed.

BRIEF DESCRIPTION OF DRAWINGS

These and other objects, features, and advantages of the present invention will be more readily apparent from the following detailed description of a preferred embodiment of the invention in which:

FIG. 5 depicts a fifth illustrative embodiment of the invention.

DETAILED DESCRIPTION OF THE DRAWINGS

Figure 1:
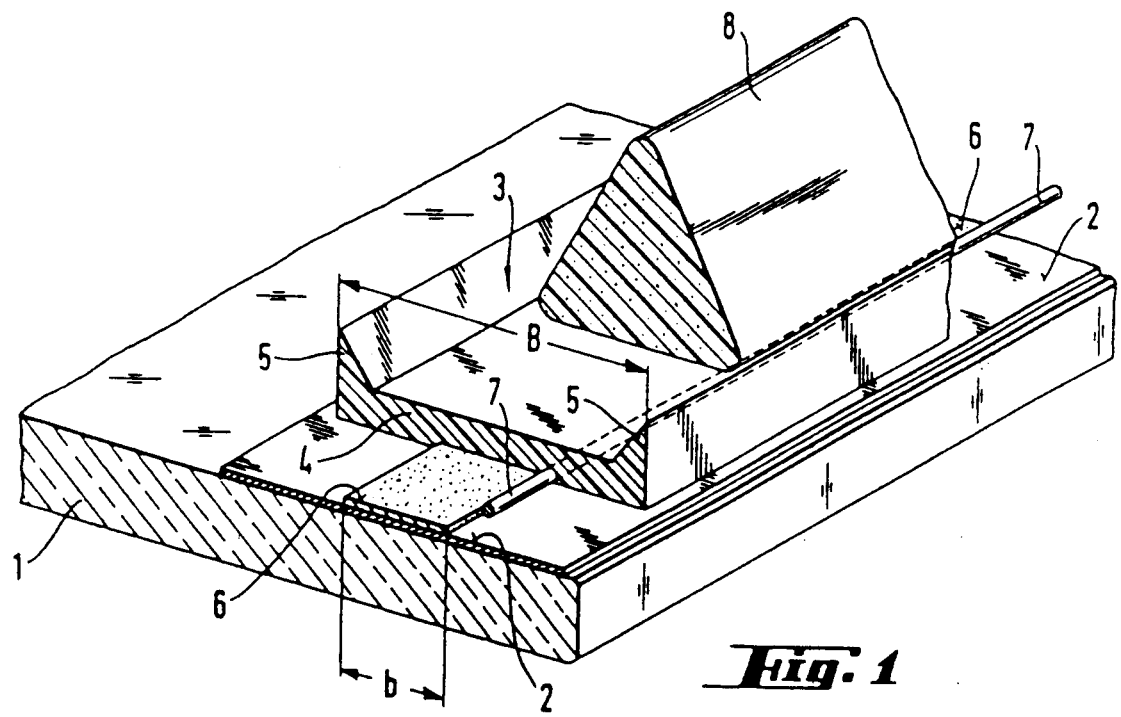
FIG. 1 depicts a first illustrative embodiment of the invention in which a profile bead is deposited on an edge of a glazing.

As shown in FIG. 1, a glazing 1 may be comprised of a monolithic single safety glazing or multiple layer, i.e., a laminated safety glazing. When used for a windshield glazing, glazing 1 is usually a laminated safety glazing. Advantageously, a frame-shaped coating 2 of a material impermeable to visible light and UV rays is placed on glazing 1 along the glazing periphery on the side of the passenger space. Coating 2 protects profile bead 3 and an assembly adhesive 8 from UV rays and prevents the view of this adhesive area. Usually coating 2 consists of a black baking finish or a black enamel, which is baked on in the course of the glazing bending process.

Profile bead 3 has an essentially U-shaped cross section comprising a center lug 4 and lateral boundary lugs 5 for confining the assembly adhesive. Width B of profile bead 3 is about 20 mm. Profile bead 3 is deposited by extrusion of an appropriate adhesive by an appropriately calibrated extrusion die directly on the glazing.

Adhesive systems from polyurethane are especially suitable as adhesives for profile bead 3, as they are described, for example, in U.S. Pat. No. 3,707,521 and U.S. Pat. No. 3,779,794. These adhesive systems consist of a primer of polyurethane, which is applied to the glazing surface or coating 2 in the form of a thin layer, and of the actual adhesive of polyurethane which is applied to the primer layer.

In the embodiment of FIG. 1, a primer layer 6 is applied to coating 2 before profile bead 3 is deposited. The width b of layer 6 is substantially less than the width B of profile bead 3, and illustratively is about 5 mm. A tear-away cord 7 is deposited simultaneously with the adhesive for profile bead 3 and is positioned directly next to primer layer 6 or on the edge of primer layer 6. Advantageously, a device such as that shown in FIG. 6 of U.S. Pat. No. 4,581,276 is used to deposit profile bead 3 and cutting cord 7.

As a result of this arrangement, after the profile bead is deposited on coating 2 and primer 6, a bond is formed between the coating and the bead in the region where the bead contacts the primer. However, outside primer layer 6 the adhesive forming profile bead 3 exhibits minimal adhesion to the glazing surface or coating 2. As a result, to remove the glazing, profile bead 3 need only be severed by cord 7 in the area above primer layer 6, i.e., only a width of approximately 5 mm.

Figure 2:
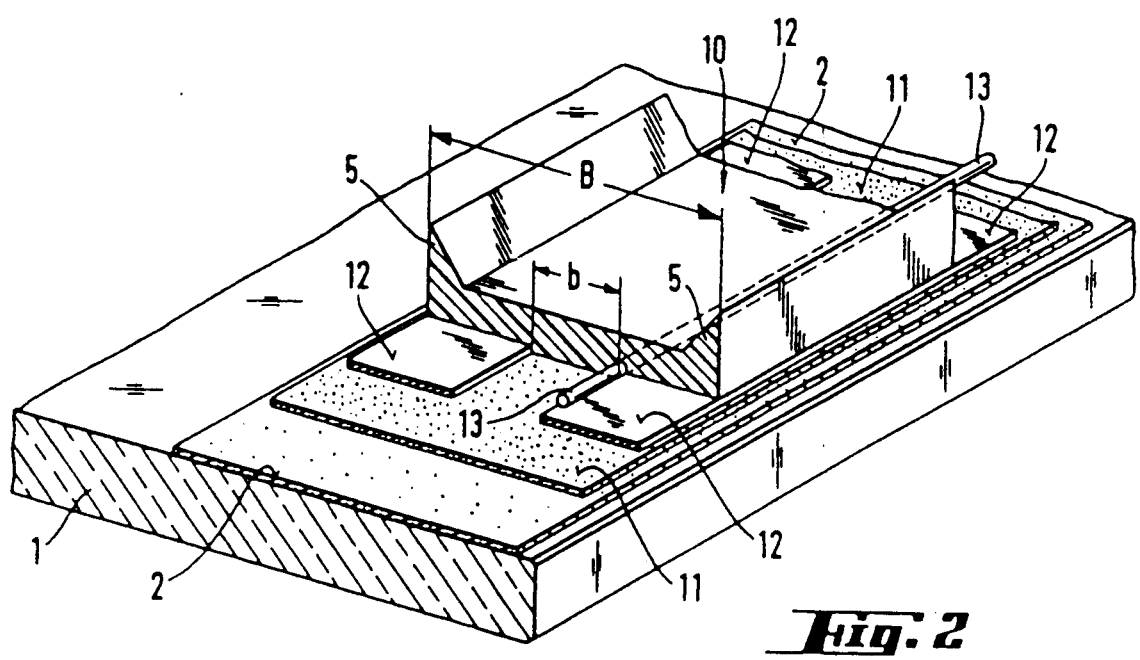
FIG. 2 depicts a second illustrative embodiment of the invention.

In the embodiment represented in FIG. 2, a profile bead 10 of the same dimensions and the same cross section as profile bead 3 is deposited on glazing 1. Again, this embodiment is formed so that the adhesive bond with glazing 1 or with coating 2 exists only in the narrow area of width b, while the portion of profile bead 10 adjacent to this area has no adhesion to coating 2 or the glazing. In this case, this differentiated adhesion is achieved by first applying a primer layer 11 over the entire width of the glazing or coating on which the profile bead is to be deposited and then, after drying or setting of primer layer 11, applying an anti-adhesion promoter or separating agent in the form of two strips 12 a distance b apart from one another. Solutions of microcrystalline waxes or paraffin-containing products, silicon oils or methylcellulose with an aqueous base are suitable as anti-adhesion promoters. A tear-away cord 13 is again simultaneously deposited with profile bead 10 on the edge of one of the two anti-adhesion promoter strips 12 on the glazing surface. Again, tear-away cord 13 and profile bead 10 are advantageously deposited by a device such as described in U.S. Pat. No. 4,581,276.

Figure 3:
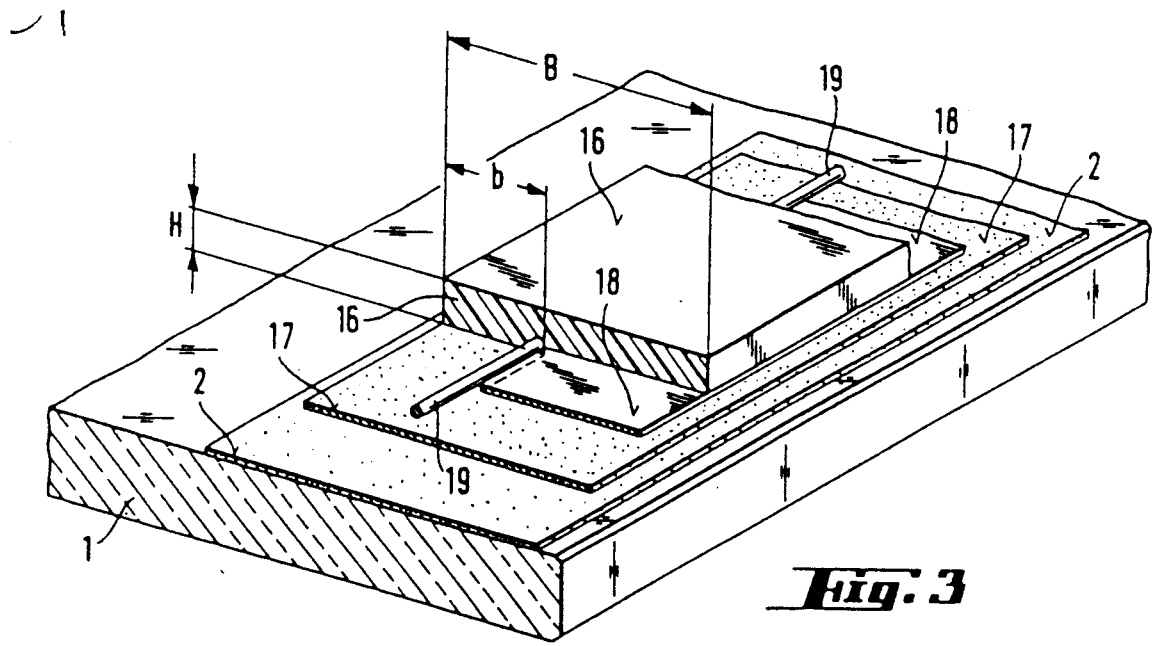
FIG. 3 depicts a third illustrative embodiment of the invention.

FIG. 3 shows an embodiment in which a profile bead 16 serving as intermediate body exhibits no lateral boundary lugs but only a rectangular or approximately rectangular cross section. Again profile bead 16 has a width B of about 20 mm and a height H of about 2 to 5 mm. A primer layer 17 is applied as above to coating 2. Primer layer 17 is partially covered by a layer 18 of an anti-adhesion promoter, so that the adhesive bond of the adhesive forming profile bead 16 with coating 2 or glazing 1 takes place only in an area of a narrow strip with a width b of about 5 mm. In this case, the area in which the profile bead adheres to the glazing is not in the center of the profile bead 16 but on the side of the profile bead 16. A tear-away cord 19 is again simultaneously deposited with the extrusion of profile bead 16 on the glazing surface.

Figure 4:
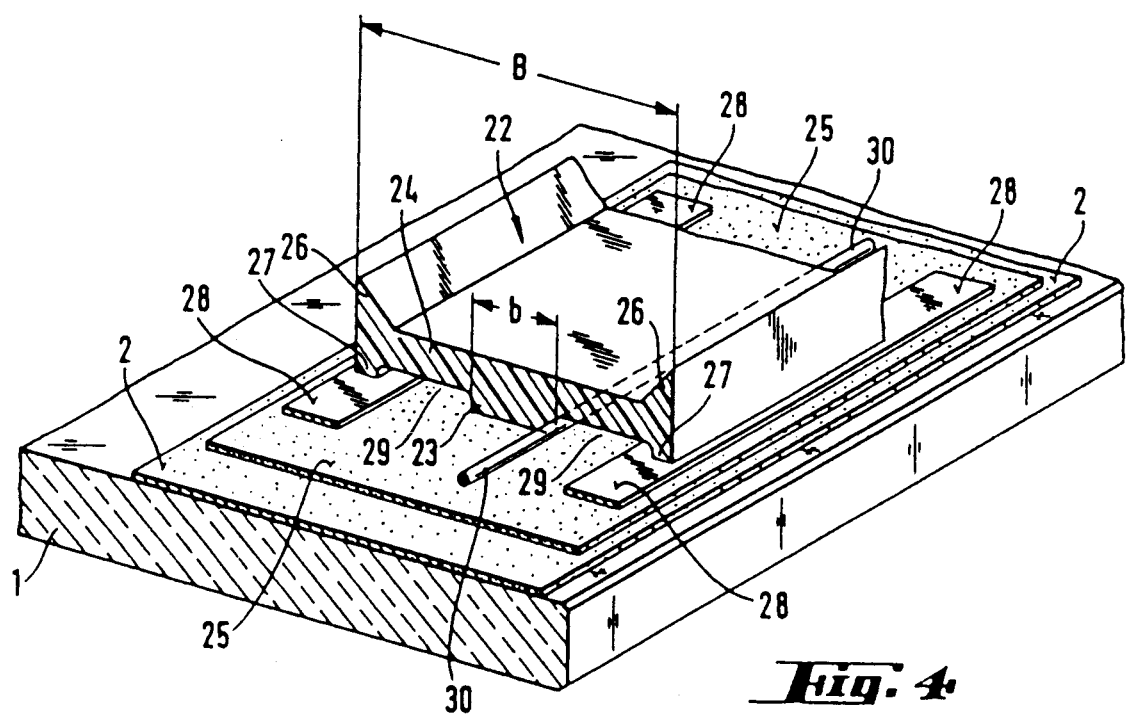
FIG. 4 depicts a fourth illustrative embodiment of the invention.

FIG. 4 shows an embodiment in which profile bead 22 has a substantially T-shaped cross section consisting of a central vertical foot part 23 and a horizontal crossbar 24. Crossbar 24 has a width B of about 20 mm and foot part 23 has a width b of about 6 mm. The ends of crossbar 24 exhibit boundary lugs 26 which are directed approximately vertical and inhibit the flowing of assembly adhesive onto the glazing. Further, crossbar 24 has on its ends downward projections 27 directed toward the glazing.

To secure the bead to the glazing, a primer 25 is deposited on coating 2 and layers 28 of an anti-adhesion promoter are applied to glazing 1 or coating 2 in the areas where the downward projections 27 are to be formed. Bead 27 is then deposited on primer 25 by extrusion. Projections 27 are supported on the glazing surface, but the surfaces of beads 27 are prevented from adhering to the glazing surface by anti-adhesion layers 28. As a result, air gaps 29 are formed between crossbar 24 and the glazing surface. A tearaway cord 30 is inserted in one of these air gaps 29 after setting of the profile bead 22, by slipping it under one of projections 27 into air gap 29.

Finally, FIG. 5 shows an embodiment for a profile bead 32 in which the contact surface for the assembly adhesive and the contact surface with the glazing have approximately the same width. In this case, profile bead 32 has a lateral constriction between these two contact surfaces so that between lower part 33 and upper part 34 of profile bead 32 there is only a central bonding lug 35 with width b. As a result profile bead 32 exhibits an X-shape with two lateral gaps 36 between its lower and upper parts. Tear-away cord 37 is placed inside one of gaps 36. Advantageously, a primer layer 38 is placed on coating 2 for improvement of adhesion.

Optionally, lateral gaps 36 may be filled simultaneously with extrusion of profile bead 32, with a material that exhibits no or only a slight adhesion to the material of profile bead 32. If the gaps are so filled, tear-away cord must be inserted in the gap simultaneously with extrusion. If, however, a gap 36 is not filled, tear-away cord 37 may be inserted after setting of profile bead 32.

While it is not shown in the drawings, it will be understood by those skilled in the art that in all cases the two ends of the tear-away cord are passed crosswise through the profile bead at one point so that the cords end on the opposite side of the bond from where they are shown in the drawings. From this position, the ends of the cord can be pulled out from the profile bead in a direction crosswise to the profile bead, thereby shearing the bead.

As will be apparent to those skilled in the art, numerous modifications may be made in the above-described invention. Instead of a tear-away cord of textile fibers or synthetic fibers, optionally a suitable wire may also be used. While the invention has been described in terms of embodiments that use a protective coating 2 to protect and hide the adhesive bond, it will be appreciated that the invention may also be practiced without such a coating.

What is claimed is:

1. A motor vehicle glazing prepared by bonding in an opening comprising:

a transparent sheet having a peripheral edge, a profile bead deposited on the peripheral edge of said sheet, said bead forming an intermediate bond between the sheet and an assembly adhesive, said bead having an upper surface which has a width equal to or larger than that of the assembly adhesive when the glazing is bonded in the opening, and a lower surface which provides a contact surface with the sheet, said bead having a substantially T-shaped cross section such that at least one air gap is formed between the sheet and the profile bead, a flexible tear-away cord with high tensile strength, said cord having been placed in one of said air gaps after the profile bead has set, so that the cord can be used to shear a section of the profile bead to remove the glazing from the opening, the section of the profile bead to be sheared for the removal of the glazing being substantially less in width than the width of the upper surface of the profile bead.

2. A motor vehicle glazing according to claim 1 wherein the profile bead comprises a center lug which is bonded to a surface of the sheet and a crossbar which is separated from said sheet surface, said air gap being formed between said cross bar and said sheet surface.

3. A motor vehicle glazing according to claim 2 wherein the profile bead is provided with downward projections on the ends of said crossbar.

4. A motor vehicle glazing according to claim 1 wherein a coating impervious to light and ultraviolet rays is located on the glazing surface beneath the profile bead.

5. A motor vehicle glazing according to claim 1 wherein the profile bead comprises lateral boundary lugs for containment of the assembly adhesive.

6. A motor vehicle glazing prepared for bonding in an opening comprising:

a transparent sheet having a peripheral edge, a profile bead deposited on the peripheral edge of said sheet, said bead forming an intermediate bond between the sheet and an assembly adhesive, said bead having an upper surface which has a width equal to or larger than that of the assembly adhesive when the glazing is bonded in the opening, and a lower surface which provides a contact surface with the sheet, said bead having a substantially X-shaped cross section in which the widths of said lower surface and said upper surface are substantially equal, said bead having a lateral constriction between said lower and upper surfaces so as to form said air gaps between the upper and lower surfaces of said bead, a flexible tear-away cord with high tensile strength, said cord having been placed in one of said air gaps after the profile bead has set, so that the cord can be used to shear a section of the profile bead to remove the glazing from the opening, the section of the profile bead to be sheared for the removal of the glazing being substantially less in width than the width of the upper surface of the profile bead.

7. A method for preparing a motor vehicle glazing for bonding in an opening, wherein the glazing comprises a transparent sheet having a peripheral edge, said method comprising the steps of:

depositing a profile bead on the peripheral edge of said sheet, said bead forming an intermediate bond between the sheet and an assembly adhesive, said bead having an upper surface which has a width equal to or larger than that of the assembly adhesive when the glazing is bonded in the opening and a lower surface which provides a contact surface with the sheet, said bead having a cross section such that at least one air gap is formed between the sheet and the assembly adhesive, inserting a flexible tear-away cord with high tensile strength in one of said air gaps after setting of the profile bead so that the cord can be used to shear a section of the profile bead so as to remove the glazing from the opening, wherein the section of the profile bead to be sheared for the removal of the glazing is substantially less in width than the width of the upper surface of the profile bead.

8. The method according to claim 7, wherein the profile bead deposited on the sheet exhibits a substantially T-shaped cross section comprising a center lug which is bonded to a surface of the sheet and a cross bar which is separated from said sheet surface, said air gap being formed between said cross bar and said sheet surface.

9. The method according to claim 8 wherein the profile bead deposited on the sheet is provided with downward projections on the ends of said crossbar.

10. The method according to claim 7, wherein the profile bead deposited on the sheet exhibits a substantially X-shaped cross section in which the widths of said lower surface and said upper surface are substantially equal, said bead having a lateral constriction between said lower and upper surfaces so as to form said air gaps between the upper and lower surfaces of said bead.

* * * * *